UNITED STATES PATENT OFFICE 2,295,020

MAKING CONFECTION PRODUCTS, FROM APPLE PRODUCTS, WITH MILK

Frank C. Vilbrandt, Robert D. Sieg and Thomas F. Farrar, Blacksburg, Va.

No Drawing. Application February 26, 1940, Serial No. 320,888

4 Claims. (Cl. 99—134)

This invention relates to new confections and processing which deal with the utilization of apple and milk products, more particularly with the control of conditions for the preparation of a confection and/or edible product from apple juice and/or apple pulp, combined with milk in any form, reduced to a solid condition.

According to this invention a new type of confection and/or edible product with pleasing taste and desirable texture and consistency are obtained by combining the milk and apple products, then drying under suitable conditions to a solid state, with or without the addition of flavors, sweetening agents or coloring material.

The term "apple products" is to be understood to comprise freshly expressed juice from the apple, clarified and unclarified, sweetened and unsweetened; evaporated juices, clarified and unclarified, sweetened and unsweetened; concentrated juices, clarified and unclarified, sweetened and unsweetened; juices from stored, fresh and cull apples in the same manner as above; apple pulp, whole and refined, with and without added apple juice; expressed apple pulp, with and without added apple juice; apple juice in any form; apple cider in any form; and apples disintegrated in any manner and processed pulp from fresh, and stored and cull apples in the same manner as above. Obviously all of these aforementioned materials aside from apples are essentially physical components of the original apple from which they are derived by simple mechanical processes, although possibly subjected to some minor chemical purification, etc. Further, all of these materials possess the same flavor characteristics as the original apple. The term "apple products" is obviously not intended to cover the more remote apple derivatives which do not possess the essential physical character, flavor, taste and/or odor commonly associated with an apple and incapable of combining with milk to produce a confection product according to the present invention.

The term milk referred to includes whole and skimmed milk, raw and pasteurized, evaporated, condensed and dried, and any of these mentioned milk products, sweetened and unsweetened.

This invention can be performed by mixing any of the apple products with any of the milk products, then causing the same to be heated and evaporated in a vacuum in any type of drier. The mixtures are preferably evaporated to a dryness in a vacuum dryer with continuous mixing so as to eliminate separation of the materials and to assist in producing a desirable consistency and texture to the dried product. Scraping of product from the heating surface from moving rolls as rapidly as formed assists in producing a product which has not become overheated, or reduced to an undesirable condition by long contact with the heated surface. Conditions of drying must be so controlled that they give a product with a texture and consistency which will not be liquid when removed from the rolls or heated surface, which will not stick to the heating surface, and which can be molded, compounded and colored with flavors, syrups, sugars and coloring substances, and which can be covered with chocolate or candied coatings without losing texture and consistency.

More specifically, in order to prevent the production of undesirable products, it is preferable to subject the mixture of apple products and milk to temperatures between 100 to 208° F. at a vacuum range of from 3 to 28 inches of mercury until the product exhibits the aforementioned characteristics.

The following examples illustrate the invention, the parts stated being by weight:

Example 1

A mixture of 5 parts of skimmed milk and 2 parts of apple juice is placed in a feed tank and slowly run between the rolls of a double-drum dryer, the vacuum in the compartment held at approximately 15 inches of mercury, with a roll clearance of 0.006 inch and a film contact of about 4 seconds. The product is scraped from the roll having an unburned taste, and a desirable texture and consistency.

Example 2

A mixture of 5 parts skimmed milk and 3 parts apple pulp is fed between the rolls of the drum dryer, heating the mixture to 170 degrees F., holding the vacuum around 17 inches mercury, the rolls at a clearance of 0.10 inch, and the contact with the rolls of about 5 seconds. The product that is scraped from the rolls has a desirable taste, texture and consistency, containing about 20 per cent moisture.

Example 3

Feed a mixture of 5 parts milk, 2 parts apple juice, 1 part sugar and 0.005 part vanilla extract into a dryer at 20 inches mercury and evaporate to a soft solid state.

Example 4

Feed a mixture of 6 parts whole milk, 2 parts apple pulp, ½ part honey into the dryer, which is maintained at 15 inches mercury vacuum, until product is soft and falls from the scraper.

What we claim is:

1. A process for preparing a milk-apple edible product comprising mixing an apple product and milk, continuously agitating the mixture and evaporating water from the mixture while maintaining the mixture under a vacuum of from 3 to 28 inches of mercury and at a temperature of from 100° F. to 208° F. until a non-sticky, substantially solid, moldable product is produced.

2. A process for preparing a milk-apple edible product comprising mixing an apple product and milk, forming the mixture into sheets, and drying the same while maintaining the mixture under a vacuum and at a temperature between 100° F. and 208° F. in a heated zone, removing a non-sticky substantially solid, moldable product from the heated zone as formed, in order to prevent overheating and over-drying thereof.

3. A process for preparing a milk-apple edible product comprising mixing an apple product and milk, forming the mixture into sheets, and drying the same, while maintaining the mixture under a vacuum of from 3 to 28 inches of mercury and at a temperature between 100° F. and 208° F. in a heated zone, and removing a non-sticky, substantially solid, moldable product from the heated zone as formed in order to prevent overheating and over-drying thereof.

4. A process for preparing a milk-apple edible product comprising mixing a minor proportion of an apple product with a major proportion of milk, forming the mixture into sheets, and drying the same while maintaining the mixture under a vacuum and at a temperature between 100° F. and 208° F., and scraping a non-sticky, substantially solid, moldable product from the rolls as formed in order to prevent overheating and over-drying thereof.

FRANK C. VILBRANDT.
ROBERT D. SIEG.
THOMAS F. FARRAR.